(12) United States Patent
Cobb et al.

(10) Patent No.: US 8,358,834 B2
(45) Date of Patent: Jan. 22, 2013

(54) BACKGROUND MODEL FOR COMPLEX AND DYNAMIC SCENES

(75) Inventors: Wesley Kenneth Cobb, The Woodlands, TX (US); Ming-Jung Seow, Houston, TX (US); Tao Yang, Katy, TX (US)

(73) Assignee: Behavioral Recognition Systems, Houston, TX (US)

( * ) Notice: Subject to any disclaimer, the term of this patent is extended or adjusted under 35 U.S.C. 154(b) by 589 days.

(21) Appl. No.: 12/543,336

(22) Filed: Aug. 18, 2009

(65) Prior Publication Data
US 2011/0044537 A1   Feb. 24, 2011

(51) Int. Cl.
*G06K 9/00* (2006.01)
(52) U.S. Cl. ........................................................ 382/155
(58) Field of Classification Search .................. 382/155
See application file for complete search history.

(56) References Cited

U.S. PATENT DOCUMENTS

| | | | |
|---|---|---|---|
| 4,679,077 A | | 7/1987 | Yuasa et al. |
| 5,113,507 A | | 5/1992 | Jaeckel |
| 5,748,775 A | | 5/1998 | Tsuchikawa et al. |
| 5,751,378 A | | 5/1998 | Chen et al. |
| 5,969,755 A | | 10/1999 | Courtney |
| 5,974,172 A | * | 10/1999 | Chen ............................ 382/166 |
| 6,252,974 B1 | | 6/2001 | Martens et al. |
| 6,263,088 B1 | | 7/2001 | Crabtree et al. |
| 6,480,615 B1 | * | 11/2002 | Sun et al. ...................... 382/103 |
| 6,570,608 B1 | | 5/2003 | Tserng |
| 6,661,918 B1 | | 12/2003 | Gordon et al. |
| 6,674,877 B1 | | 1/2004 | Jojic et al. |
| 6,678,413 B1 | | 1/2004 | Liang et al. |
| 6,856,249 B2 | | 2/2005 | Strubbe et al. |
| 6,940,998 B2 | | 9/2005 | Garoutte |
| 7,076,102 B2 | | 7/2006 | Lin et al. |
| 7,136,525 B1 | | 11/2006 | Toyama et al. |
| 7,158,680 B2 | | 1/2007 | Pace |
| 7,200,266 B2 | | 4/2007 | Ozer et al. |
| 7,227,893 B1 | | 6/2007 | Srinivasa et al. |
| 7,436,887 B2 | | 10/2008 | Yeredor et al. |
| 7,623,677 B2 | * | 11/2009 | Girgensohn et al. .......... 382/103 |
| 7,825,954 B2 | | 11/2010 | Zhang et al. |
| 7,868,912 B2 | | 1/2011 | Venetianer et al. |
| 2003/0107650 A1 | | 6/2003 | Colmenarez et al. |
| 2004/0151342 A1 | | 8/2004 | Venetianer et al. |
| 2005/0001759 A1 | | 1/2005 | Khosla |
| 2005/0105765 A1 | | 5/2005 | Han et al. |

(Continued)

FOREIGN PATENT DOCUMENTS

WO   2009049314 A2   4/2009

OTHER PUBLICATIONS

International Search Report and Written Opinion of Patent Cooperation Treaty Application Serial No. PCT/US2010/045227 dated Apr. 12, 2011.

(Continued)

*Primary Examiner* — Vikkram Bali
(74) *Attorney, Agent, or Firm* — Patterson & Sheridan LLP

(57) ABSTRACT

Techniques are disclosed for learning and modeling a background for a complex and/or dynamic scene over a period of observations without supervision. A background/foreground component of a computer vision engine may be configured to model a scene using an array of ART networks. The ART networks learn the regularity and periodicity of the scene by observing the scene over a period of time. Thus, the ART networks allow the computer vision engine to model complex and dynamic scene backgrounds in video.

22 Claims, 8 Drawing Sheets

U.S. PATENT DOCUMENTS

| | | | |
|---|---|---|---|
| 2005/0240629 A1 | 10/2005 | Gu et al. | |
| 2006/0018516 A1 | 1/2006 | Masoud et al. | |
| 2006/0165386 A1 | 7/2006 | Garoutte | |
| 2006/0190419 A1 | 8/2006 | Bunn et al. | |
| 2006/0222206 A1 | 10/2006 | Garoutte | |
| 2007/0183663 A1 | 8/2007 | Wang et al. | |
| 2007/0269105 A1* | 11/2007 | Zhang et al. | 382/165 |
| 2008/0002856 A1 | 1/2008 | Ma et al. | |
| 2008/0095436 A1 | 4/2008 | Kim et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |
| 2011/0043536 A1* | 2/2011 | Cobb et al. | 345/629 |
| 2011/0311129 A1* | 12/2011 | Milanfar et al. | 382/154 |

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

Helmut Grabner et al., "On-line Boosting and Vision," IEEE Conference on Computer Vision and Pattern Recognition (CVPR), Jun. 2006, vol. 1: pp. 260-267.

Chris Stauffer et al., "Adaptive background mixture models for real-time tracking," Proceedings IEEE Conference on Computer Vision and Pattern Recognition, Jun. 1999: pp. 246-252.

Pentti Kanerva "Sparse Distributed memory and Related Models," M.H. Hassoun, ed., Associative Neural Memories: Theory and Implementation, Aug. 1993, pp. 50-76. New York: Oxford University Press.

Senior et al. "Appearance Models for Occlusion Handling," IBM T.J. Watson Research Center, Dec. 2001, 8 pages, Yorktown, Heights, NY US.

* cited by examiner

BACKGROUND MODEL FOR COMPLEX AND DYNAMIC SCENES

BACKGROUND OF THE INVENTION

1. Field of the Invention

Embodiments of the invention provide techniques for computationally analyzing a sequence of video frames. More specifically, embodiments of the invention relate to techniques for generating background model representing a scene depicted in the sequence of video frames.

2. Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera.

Prior to analyzing scene foreground, a background model (or image) of the scene may need to be identified. The background model generally represents the static elements of a scene captured by a video camera. For example, consider a video camera trained on a stretch of highway. In such a case, the background would include the roadway surface, the medians, any guard rails or other safety devices, and traffic control devices, etc., visible to the camera. The background model may include an expected pixel color value for each pixel of the scene when the background is visible to the camera. Thus, the background model provides an image of the scene in which no activity is occurring (e.g., an empty roadway). Conversely, vehicles traveling on the roadway (and any other person or thing engaging in some activity) occlude the background when visible to the camera and represent scene foreground objects.

However, some scenes present dynamic or otherwise complex backgrounds making it difficult to distinguish between scene background and foreground. Examples of complex backgrounds include ones where the video is noisy, the video contains compression artifacts, or the video is captured during periods of low or high illumination. In such cases, it becomes difficult to classify any given pixel from frame-to-frame as depicting background or foreground, (e.g., due to pixel color fluctuations that occur due to camera noise). A scene background is dynamic when certain elements of the background are not stationary or have multiple, visually distinguishable, states. Consider a scene with a camera trained on a bank of elevators. In such a case, the pixels depicting a closed elevator door would represent one background state, while a back wall of an elevator carriage visible when the elevator doors were open would be another state. Another example includes a traffic light changing from green to yellow to red. The changes in state can result in portions of the traffic light being incorrectly classified as depicting a foreground object. Other examples of a dynamic background include periodic motion such as a scene trained on a waterfall or ocean waves. While these changes in the scene are visually apparent as changes in pixel color from frame-to-frame, they should not result in elements of the background such as pixels depicting an elevator carriage or the pixels depicting light bulbs within a traffic light being classified as foreground.

SUMMARY OF THE INVENTION

Embodiments of the invention relate to techniques for modeling the background of a scene captured by a video camera or other recorded video. One embodiment includes a computer-implemented method for generating a background model of a scene depicted in a sequence of video frames captured by a video camera. The method itself may generally include receiving a video frame. The video frame includes one or more appearance values (e.g., RGB color values) for each of a plurality of pixels. The method may also include, for one or more of the pixels, passing the appearance values for the pixel to an input layer of an adaptive resonance theory (ART) network corresponding to the pixel, mapping, by the ART network, the appearance values to one of one or more clusters of the ART network, and classifying the pixel as depicting one of scene background and scene foreground, based on the mapping of the appearance values to the cluster of the ART network.

Another embodiment of the invention includes a computer-readable storage medium containing a program, which when executed on a processor, performs an operation for generating a background model of a scene depicted in a sequence of video frames captured by a video camera. The operation itself may generally include receiving a video frame. The video frame includes one or more appearance values for each of a plurality of pixels; The operation may also include, for one or more of the pixels, passing the appearance values for the pixel to an input layer of an adaptive resonance theory (ART) network corresponding to the pixel, mapping, by the ART network, the appearance values to one of one or more clusters of the ART network, and classifying the pixel as depicting one of scene background and scene foreground, based on the mapping of the appearance values to the cluster of the ART network.

Still another embodiment of the invention provides a system. The system itself may generally include a video input source configured to provide a sequence of video frames, each depicting a scene, a processor and a memory containing a program, which, when executed on the processor is configured to perform an operation for generating a background model of a scene depicted in a sequence of video frames captured by a video camera.

The operation itself may generally include receiving a video frame. The video frame includes one or more appearance values for each of a plurality of pixels; The operation may also include, for one or more of the pixels, passing the appearance values for the pixel to an input layer of an adaptive resonance theory (ART) network corresponding to the pixel, mapping, by the ART network, the appearance values to one of one or more clusters of the ART network, and classifying the pixel as depicting one of scene background and scene foreground, based on the mapping of the appearance values to the cluster of the ART network.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
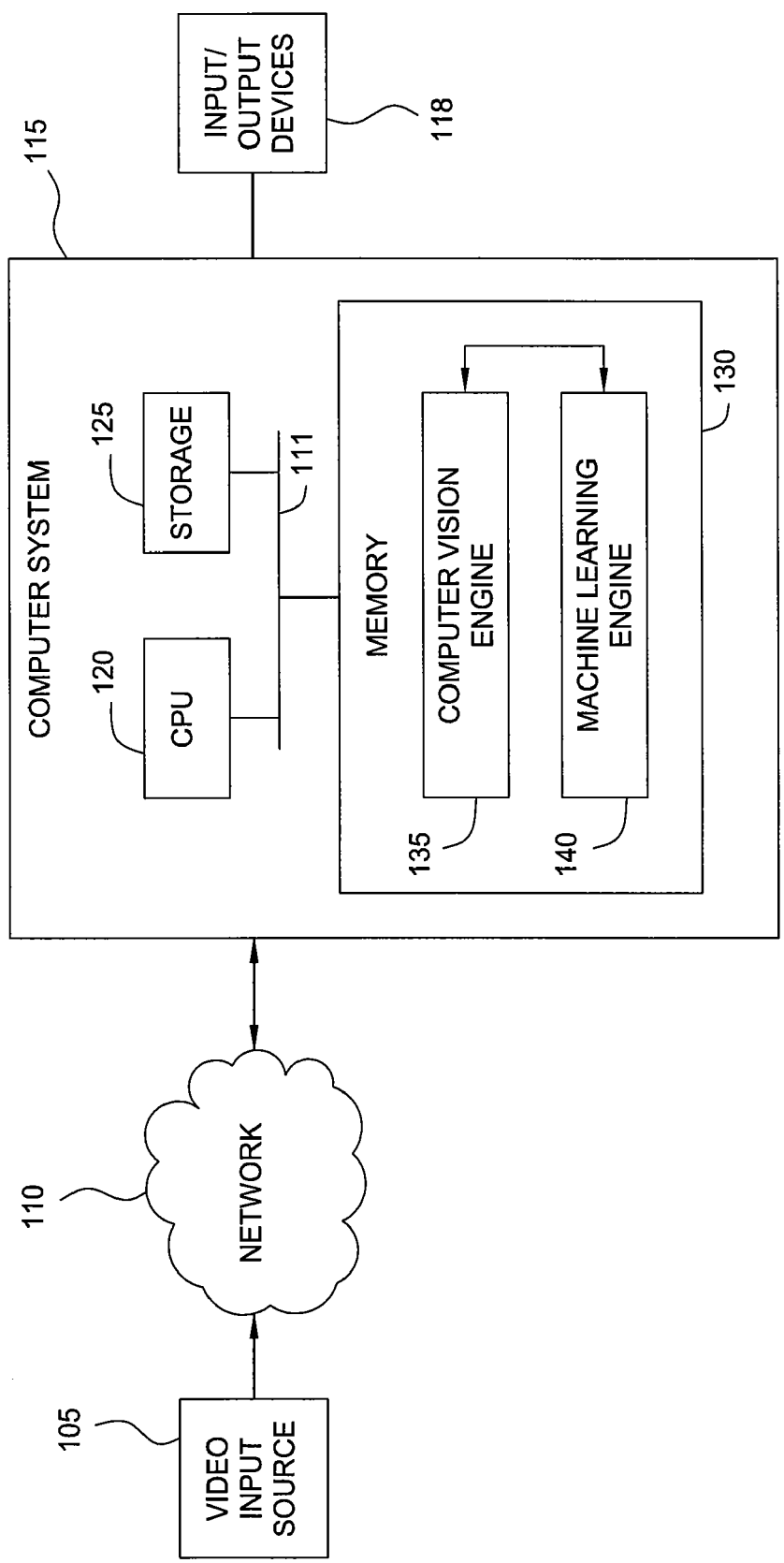
FIG. 1 illustrates components of a video analysis system, according to one embodiment of the invention.

Embodiments of the invention provide techniques for generating a background model for a complex and/or dynamic scene over a period of observations without supervision. The approaches described herein allow a background model generated by a computer vision engine to adapt to recognize different background states observed in the scene over time. Thus, the computer vision engine may more accurately distinguish between novel objects (foreground) present in the scene and elements of scene background, particularly for scenes with dynamic or complex backgrounds.

In one embodiment, an array of Adaptive Resonance Theory (ART) networks is used to generate a background model of the scene. For example, the background model may include a two-dimensional (2D) array of ART networks, where each pixel is modeled using one of the ART networks in the 2D array. When the background model is initiated, the 2D array of ART networks observes the image for regular (or periodic) patterns occurring in the pixel color values. As described in greater detail herein, an ART network may contain multiple clusters, each described by means and variances. The means and the variances for the clusters are updated in each successive video frame. In context of the present invention, each cluster in an ART network may represent a distinct background state for the corresponding pixel. Additionally, each cluster may be monitored for maturity. When a cluster in the ART network for pixel (x, y) has matured, it is used to classify that pixel as depicting either foreground or background; namely, if the RGB values for a pixel map to a mature cluster, then that pixel is presumed to depict scene background.

Thus, each ART network in the 2D array models one of the pixels over multiple frames of video by creating new clusters, modifying, merging, and removing clusters from the network, based on the pixel color values for that pixel observed over time. Classification is applied using choice tests and vigilance tests. The choice test measures the length between two points (learned point of cluster vs. test point) in the RGB space. The vigilance test measures the angle between two points in the RGB space. The similarity measure used for the vigilance test helps prevent the background model from classifying weak shadow as foreground. The creation of a new cluster may indicate either a valid change of a pixel or a noisy pixel. The modification of an existing cluster reinforces the significance/importance of a cluster. The merging of multiple clusters maintains the accuracy, stability, and scalability of the background model. The deletion of a cluster removes a weak belief of a new background/foreground state for the corresponding pixel.

For example, in a scene where a door is generally always open or closed, the door 'open' and 'close' states could be considered as layer in the proposed background model and therefore be treated as background. Furthermore, noise in the scene may be modeled using multiple clusters in an ART and therefore be treated as background. Moreover, a random car drove by the scene does not result in a new background state because any clusters generated for a pixel depicting the car over a small number of frames is unstable and eventually deleted when not reinforced. Consequently, the proposed background model is adaptive to complex and dynamic environments in a manner that does not require any supervision; thus, it is suitable for long-term observation in a video surveillance application.

Once the background model for a scene has matured, the computer vision engine may compare the pixel values for a given frame with the background image and identify objects as they appear and move about the scene. Typically, when a region of pixels in the scene (referred to as a "blob" or "patch") is classified as depicting foreground, the patch itself is identified as a foreground object. Once identified, the object may be evaluated by a classifier configured to determine what is depicted by the foreground object (e.g., a vehicle or a person). Further, the computer vision engine may identify features (e.g., height/width in pixels, average color values, shape, area, and the like) used to track the object from frame-to-frame. Further still, the computer vision engine may derive a variety of information while tracking the object from frame-to-frame, e.g., position, current (and projected) trajectory, direction, orientation, velocity, acceleration, size, color, and the like. In one embodiment, the computer vision outputs this information as a stream of "context events" describing a collection of kinematic information related to each foreground object detected in the video frames.

Data output from the computer vision engine may be supplied to the machine-learning engine. In one embodiment, the machine-learning engine may evaluate the context events to generate "primitive events" describing object behavior. Each primitive event may provide some semantic meaning to a group of one or more context events. For example, assume a camera records a car entering a scene, and that the car turns and parks in a parking spot. In such a case, the computer vision engine could initially recognize the car as a foreground object; classify it as being a vehicle, and output kinematic data describing the position, movement, speed, etc., of the car in the context event stream. In turn, a primitive event detector could generate a stream of primitive events from the context event stream such as "vehicle appears," vehicle turns," "vehicle slowing," and "vehicle stops" (once the kinematic information about the car indicated a speed of 0). As events occur, and re-occur, the machine-learning engine may create, encode, store, retrieve, and reinforce patterns representing the events observed to have occurred, e.g., long-term memories representing a higher-level abstraction of a car parking in the scene—generated from the primitive events underlying the higher-level abstraction. Further still, patterns representing an event of interest may result in alerts passed to users of the behavioral recognition system.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples of computer readable media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine-learning engine 140. As described in greater detail below, the computer vision engine 135 and the machine-learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

As noted above, the computer vision engine 135 may be configured to analyze this raw information to identify active objects in the video stream, classify the objects, derive a variety of metadata regarding the actions and interactions of such objects, and supply this information to a machine-learning engine 140. And in turn, the machine-learning engine 140 may be configured to evaluate, observe, learn and remember details regarding events (and types of events) that transpire within the scene over time.

In one embodiment, the machine-learning engine 140 receives the video frames and the data generated by the computer vision engine 135. The machine-learning engine 140 may be configured to analyze the received data, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is may be provided to output devices 118 to issue alerts, for example, an alert message presented on a GUI interface screen. In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 analyzes each frame in real-time to derive a set of information about what is occurring within a given frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application 250 running on another computer system may request (or receive) the results of over network 110.

Figure 2:
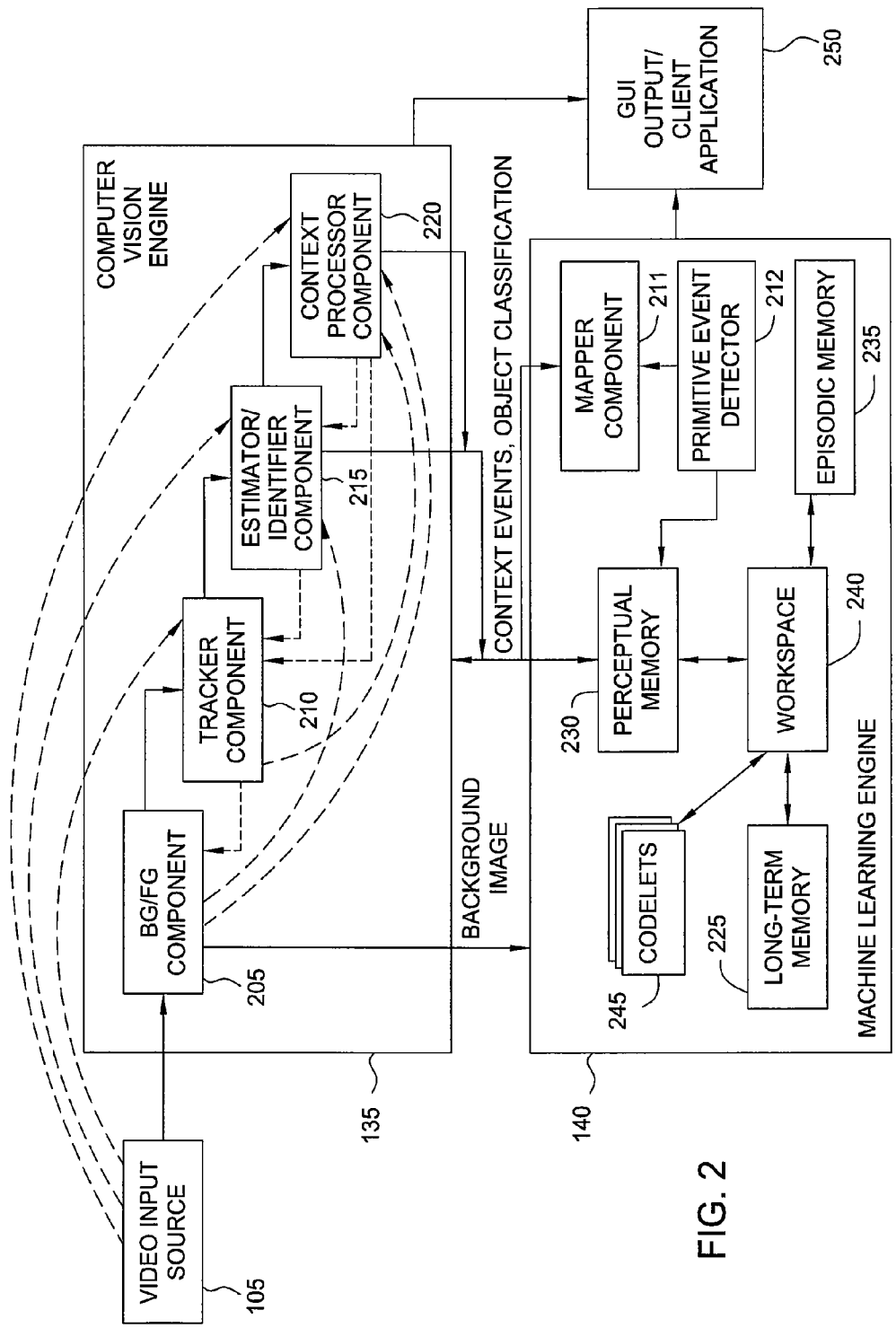
FIG. 2 further illustrates components of the video analysis system shown in FIG. 1, according to one embodiment of the invention.

FIG. 2 further illustrates components of the computer vision engine 135 and the machine-learning engine 140 first illustrated in FIG. 1, according to one embodiment of the present invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case.

In one embodiment, the BG/FG component 205 may be configured to separate each frame of video provided by the video input source 105 into a stationary or static part (the scene background) and a collection of volatile parts (the scene foreground.) The frame itself may include a two-dimensional array of pixel values for multiple channels (e.g., RGB channels for color video or grayscale channel or radiance channel for black and white video). As noted above, the BG/FG component 205 may model the background states for each pixel using a corresponding ART network. That is, each pixel may be classified as depicting scene foreground or scene background using an ART network modeling a given pixel.

Additionally, the BG/FG component 205 may be configured to generate a mask used to identify which pixels of the scene are classified as depicting foreground and, conversely, which pixels are classified as depicting scene background. The BG/FG component 205 then identifies regions of the scene that contain a portion of scene foreground (referred to as a foreground "blob" or "patch") and supplies this information to subsequent stages of the pipeline. In one embodiment, a patch may be evaluated over a number of frames before being forwarded to other components of the computer vision engine 135. For example, the BG/FG component 205 may evaluate features of a patch from frame-to-frame to make an initial determination that the patch depicts a foreground agent in the scene as opposed to simply a patch of pixels classified as foreground due to camera noise or changes in scene lighting. Additionally, pixels classified as depicting scene background maybe used to a background image modeling the scene.

The tracker component 210 may receive the foreground patches produced by the BG/FG component 205 and generate computational models for the patches. The tracker component 210 may be configured to use this information, and each successive frame of raw-video, to attempt to track the motion of the objects depicted by the foreground patches as they move about the scene.

The estimator/identifier component 215 may receive the output of the tracker component 210 (and the BF/FG component 205) and classify each tracked object as being one of a known category of objects. For example, in one embodiment, estimator/identifier component 215 may classify a tracked object as being a "person," a "vehicle," an "unknown," or an "other." In this context, the classification of "other" represents an affirmative assertion that the object is neither a "person" nor a "vehicle." Additionally, the estimator/identifier component may identify characteristics of the tracked object, e.g., for a person, a prediction of gender, an estimation of a pose (e.g., standing or sifting) or an indication of whether the person is carrying an object. In an alternative embodiment, the machine learning engine 140 may classify foreground objects observed by the vision engine 135. For example, the machine-learning engine 140 may include an unsupervised classifier configured to observe and distinguish among different agent types (e.g., between people and vehicles) based on a plurality of micro-features (e.g., size, speed, appearance, etc.).

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and classified (by estimator identifier component 215). For example, the context processor component 220 may evaluate a foreground object from frame-to-frame and output context events describing that object's height, width (in pixels), position (as a 2D coordinate in the scene), acceleration, velocity, orientation angle, etc.

The computer vision engine 135 may take the outputs of the components 205, 210, 215, and 220 describing the motions and actions of the tracked objects in the scene and supply this information to the machine-learning engine 140. In one embodiment, the primitive event detector 212 may be configured to receive the output of the computer vision engine 135 (i.e., the video images, the object classifications, and context event stream) and generate a sequence of primitive events—labeling the observed actions or behaviors in the video with semantic meaning. For example, assume the computer vision engine 135 has identified a foreground object and classified that foreground object as being a vehicle and the context processor component 220 estimates the kinematic data regarding the car's position and velocity. In such a case, this information is supplied to the machine-learning engine 140 and the primitive event detector 212. In turn, the primitive event detector 212 may generate a semantic symbol stream providing a simple linguistic description of actions engaged in by the vehicle. For example, a sequence of primitive events related to observations of the computer vision engine 135 occurring at a parking lot could include formal language vectors representing the following: "vehicle appears in scene," "vehicle moves to a given location," "vehicle stops moving," "person appears proximate to vehicle," "person moves," "person leaves scene" "person appears in scene," "person moves proximate to vehicle," "person disappears," "vehicle starts moving," and "vehicle disappears." As described in greater detail below, the primitive event stream may be supplied to excite the perceptual associative memory 230.

Illustratively, the machine-learning engine 140 includes a long-term memory 225, a perceptual memory 230, an episodic memory 235, a workspace 240, codelets 245, and a mapper component 211. In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream) and a primitive event stream generated by primitive event detector 212. The episodic memory 235 stores data representing observed events with details related to a particular episode, e.g., information describing time and space details related on an event. That is, the episodic memory 235 may encode specific details of a particular event, i.e., "what and where" something occurred within a scene, such as a particular vehicle (car A) moved to a location believed to be a parking space (parking space 5) at 9:43 AM.

The long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as a binary ART network and a sparse-distributed memory data structure.

The mapper component 211 may receive the context event stream and the primitive event stream and parse information to multiple ART networks to generate statistical models of what occurs in the scene for different groups of context events and primitive events.

Generally, the workspace 240 provides a computational engine for the machine-learning engine 140. For example, the workspace 240 may be configured to copy information from the perceptual memory 230, retrieve relevant memories from the episodic memory 235 and the long-term memory 225, select and invoke the execution of one of codelets 245. In one embodiment, each codelet 245 is a software program configured to evaluate different sequences of events and to determine how one sequence may follow (or otherwise relate to) another (e.g., a finite state machine). More generally, the codelet may provide a software module configured to detect interesting patterns from the streams of data fed to the machine-learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine-learning engine 140 performs a cognitive cycle used to observe, and learn, about patterns of behavior that occur within the scene.

Figure 3:
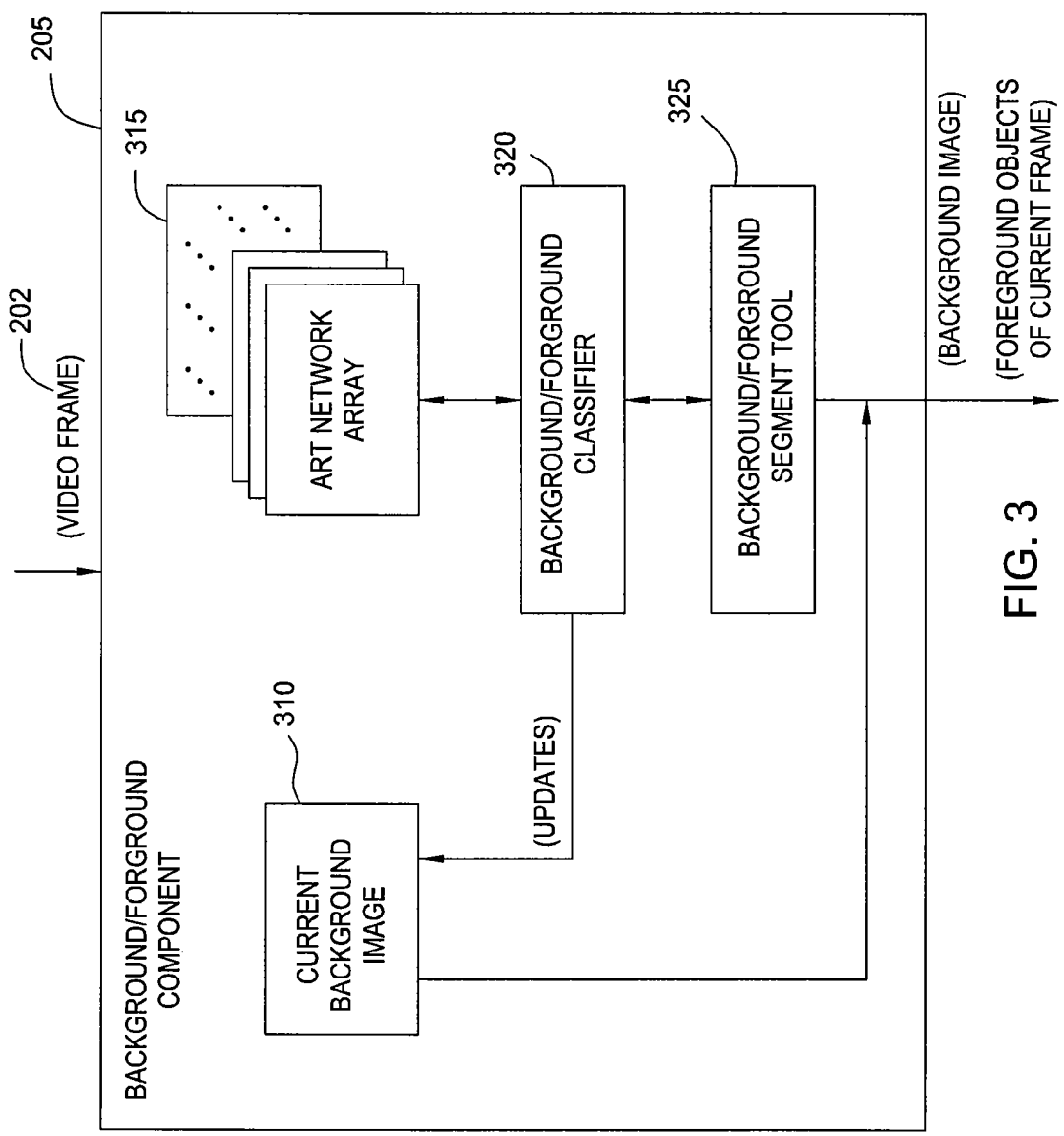
FIG. 3 illustrates an example of a background/foreground component of the video analysis system shown in FIG. 2, according to one embodiment of the invention.

FIG. 3 illustrates an example of a background/foreground (BG/FG) component 205 of the computer vision engine 135 system shown in FIG. 2, according to one embodiment of the invention. As shown, the BG/FG component 205 includes a current background image 310, an ART network array 315, a background/foreground classifier 320 and a background/foreground segmentation tool 325.

The current background image 310 generally provides an RGB (or grayscale) value for each pixel in a scene being observed by the computer vision engine 135. The RGB values in the background image 310 specify a color value expected when the background of the scene is visible to the camera. That is, the color values observed in a frame of video when not occluded by a foreground object. The BG/FG classifier 320 may update the color values of pixels in the background image 310 dynamically while the computer vision engine observes a sequence of video frames.

In one embodiment, the BG/FG component 205 is configured to receive a current frame of video 302 from an input source (e.g., a video camera). And in response, the BG/FG component 205 classifies each pixel in the frame as depicting scene background or scene foreground. For example, the RGB values for a given pixel may be passed to an input layer of a corresponding ART network in the ART network array 315. Each ART network in the array 315 provides a specialized neural network configured to create clusters from a group of inputs (e.g., RGB pixel color values received from frame-to-frame). Each cluster in an ART network may be characterized by a mean and a variance from a prototype input representing that cluster (i.e., from an RGB value representing that cluster). The prototype is generated first, as a copy of the input vector used to create a new cluster (i.e., from the first set of RGB values used to create the new cluster). Subsequently, as new input RGB values are mapped to an existing cluster, the prototype RGB values (and the mean and variance for that cluster) may be updated using the input RGB values.

Additionally, the BG/FG component 205 may track how many input vectors (e.g., RGB pixel color values) map to a given cluster. Once a cluster has "matured" the BG/FG classifier 320 classifies a pixel mapping to that cluster as depicting scene background. In one embodiment, a cluster is "matured" once a minimum number of input RBG values have mapped to that cluster. Conversely, the BG/FG component 205 may classify pixels mapping to a cluster that has not matured (or pixels that result in a new cluster) as depicting an element of scene foreground.

For example, in context of the present invention, an ART network in array 315 receives a vector storing the RGB color values of a pixel in the video frame 202. The particular ART network receives the RGB pixel color values for that same pixel from frame-to-frame. In response, the ART network may either update an existing cluster or create a new cluster, as determined using a choice and a vigilance test for the ART network. The choice and vigilance tests are used to evaluate the RGB input values passed to the ART network. The choice test may be used to rank the existing clusters, relative to the vector input RGB values. In one embodiment, the choice test may compute a Euclidian distance in RGB space between each cluster and the input RGB value, and the resulting distances can be ranked by magnitude (where smaller distances are ranked higher than greater distances). Once ranked, the vigilance test evaluates the existing clusters to determine whether to map the RGB input to one of the ranked clusters. In one embodiment, the vigilance test may compute a cosine angle between the two points (relative to a <0, 0, 0> origin of RGB space).

If no cluster is found to update using the RGB values supplied to the input layer (evaluated using the ranked clusters) then a new cluster is created. Subsequent input vectors that most closely resemble the new cluster (also as determined using the choice and vigilance test) are then used to update that cluster. As is known, the vigilance parameter has considerable influence on an ART network; higher vigilance produces many, fine-grained clusters, where a while lower vigilance results in more general clusters. In one embodiment, the ART networks in array 315 may provide dynamic cluster sizes. For example, each cluster may be given an initial shape and size, such as a radius of 5-10. Each new input to a given ART network in array 315 is then used to update the size of a cluster for each dimension of input data (or create a new cluster).

Additionally, in one embodiment, the ART networks in array 315 may also be configured to provide for cluster decay. For example, each ART network in array 315 may be configured remove a cluster that is not reinforced. In such a case, if a new cluster is created, but no new inputs (e.g., RGB values) map to that cluster for a specified period, then that ART network may simply remove the cluster. Doing so avoids transient elements (namely foreground objects which occlude the background) from being misclassified as scene background.

As clusters emerge in the ART networks in array 315, the background/foreground (BG/FG) classifier 320 may evaluate the ART networks to classify each pixel in the input video frame as depicting scene foreground or scene background. Additionally, the BG/FG classifier 320 may be configured to update the background image 310 using the RGB values of pixels classified as depicting scene background. For example, in one embodiment, the current background image may be updated using the input frame as follows. First, each pixel appearance value (e.g., RGB values) is mapped to the ART network in array 315 corresponding to that pixel. If a given pixel maps to a cluster determined to model a background state, then that pixel is assigned a color value based on that cluster. Namely, each cluster has a mean which may be used to derive a set of RGB color values. In particular, the RGB values that would map directly to the mean value in the cluster.

For pixels in frame 202 with appearance values that do not map to a cluster classified as background, the mean for the closest cluster (determined using a Euclidian distance measure) may be used to select an RGB values. Alternatively, as the background elements in the scene may have been occluded by a foreground agent, the RGB values in the current background image 310 may remain unchanged. For a scene with multiple background states, this latter approach leaves the background image in the last observed state. For example, consider a person standing in front of a closed elevator door. In such a case, the last observed pixel RGB values may correspond to the color of the closed elevator door. When the person (a foreground object) occludes the door (e.g., while waiting for the elevator doors to open). the occluded pixels retain the last observation (state) while other pixels in the frame mapping to background clusters in the art network are updated.

Once each pixel in the input frame is classified, the BG/FG segmentation tool 325 may be configured to identify contiguous regions of pixels classified as foreground. Such regions identify a foreground patch passed to other elements of the computer vision engine 135. As noted, the BG/FG segmentation tool may evaluate a patch over a number of frames before forwarding a patch to other elements of the computer vision engine 135, e.g., to ensure that a given foreground patch is not the result of camera noise or changes in scene lighting. Additionally, the current background image 310 may be provided to other components of the computer vision engine 135 or machine-learning 140, after being updated with each successive frame.

Figure 4:
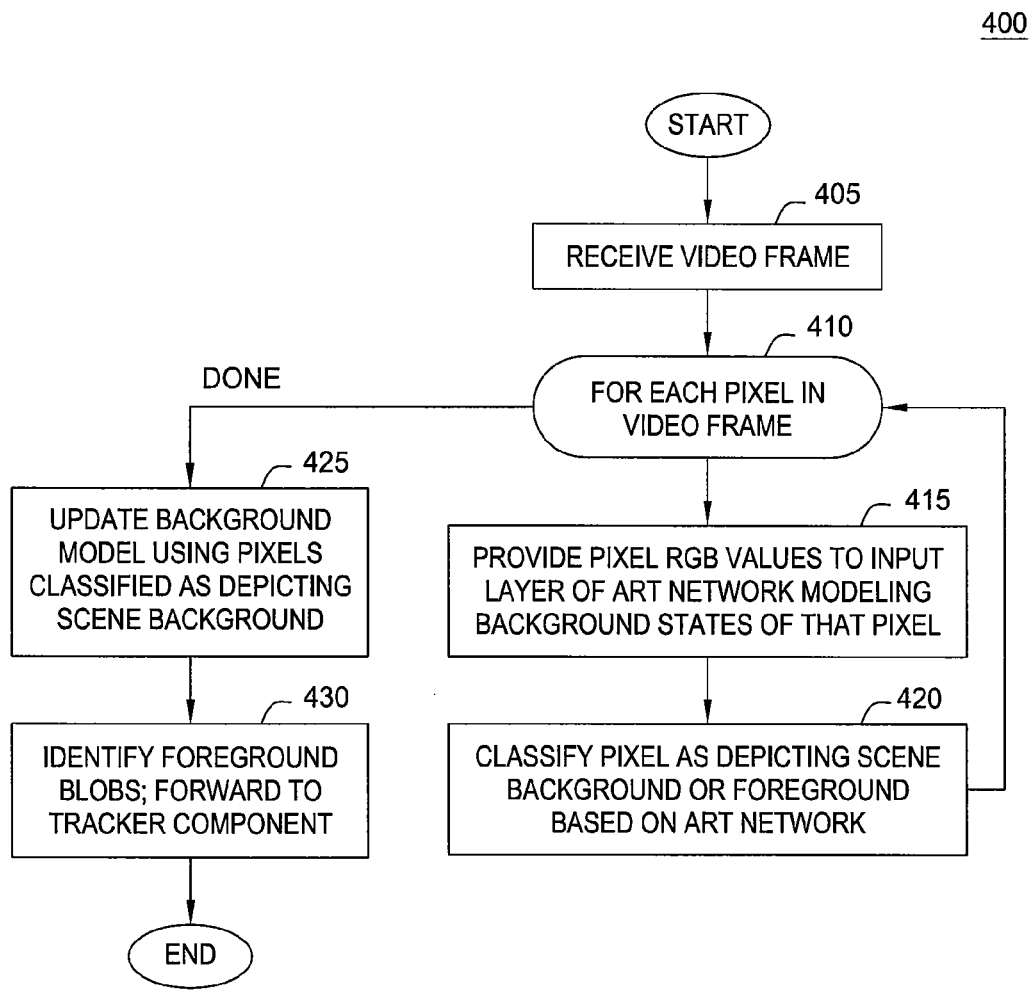
FIG. 4 illustrates a method for classifying pixels in a frame of video as depicting scene background or foreground, according to one embodiment of the invention.

FIG. 4 illustrates a method 400 for classifying pixels in a frame of video as depicting scene background or foreground, according to one embodiment of the invention. As shown, the method 400 begins at step 405 where the BG/FG component receives a frame of video. As noted above, each frame may provide a 2D array of pixel appearance values, such as an RGB color value or grayscale radiance value. A loop begins at step 410 where the appearance values for each pixel are evaluated. First, at step 415, RGB values for one of the pixels in the input frame are passed to the input layer of an ART network modeling the background state(s) of that pixel. At step 420, after the ART network has mapped the input RGB values to a cluster (or generated a new cluster) the pixel is classified as depicting scene background or foreground.

Following the loop of step 410, at step 425, the BG/FG component 205 updates the background model using pixels classified as depicting scene background. And at step 430, foreground patches are identified and forwarded to other components of the computer vision engine and./or machine-learning engine, e.g., the tracker component.

Figure 5:
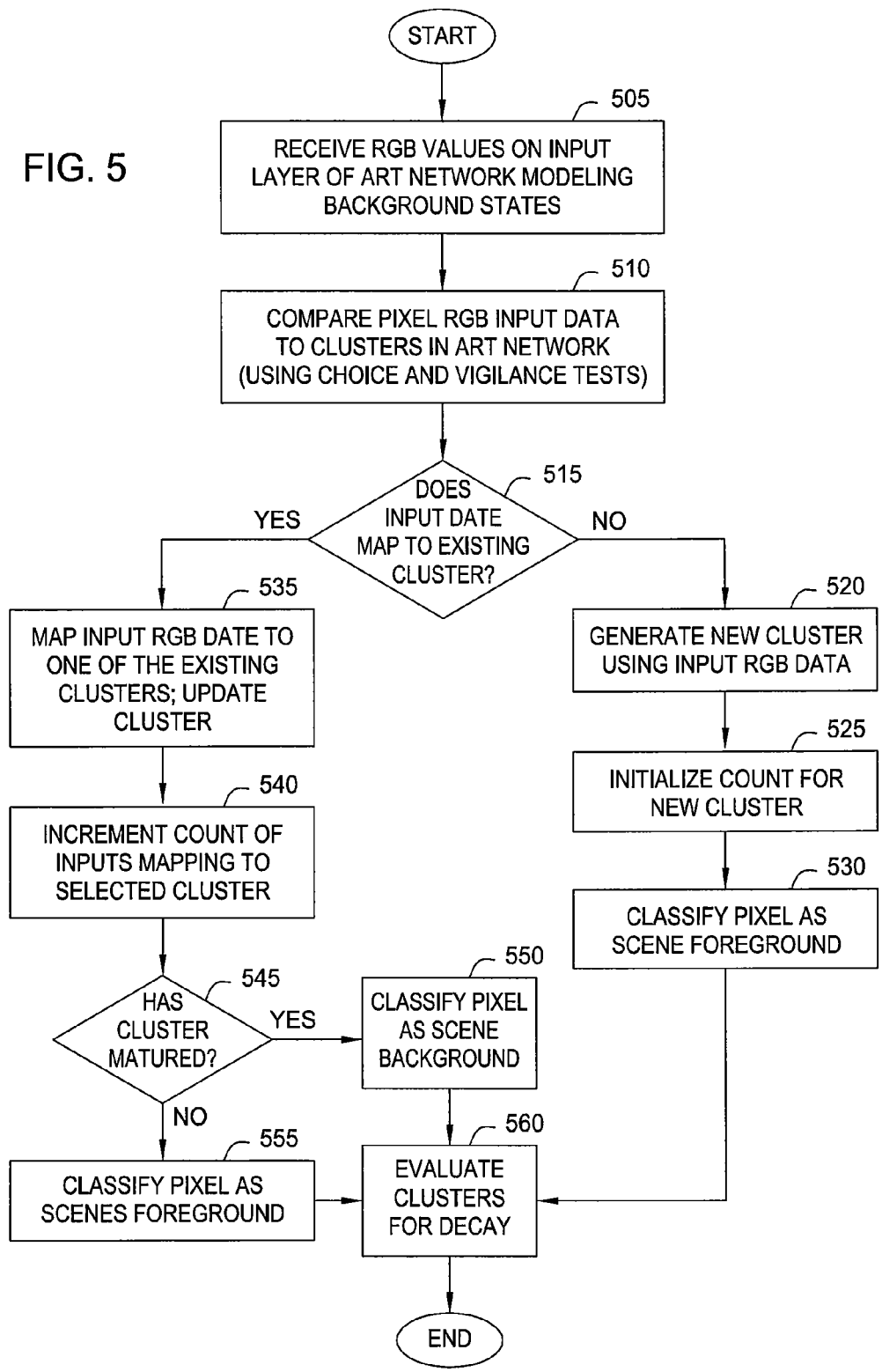
FIG. 5 illustrates a method for classifying a pixel as depicting scene background or foreground, according to one embodiment of the invention.

FIG. 5 illustrates a method 500 for classifying a pixel as depicting scene background or foreground, according to one embodiment of the invention. The method 500 generally corresponds to steps 415 and 420 of the method illustrated in FIG. 4. That is, the method 500 illustrates one pixel from a frame of video being evaluated ad classified as depicting scene background of scene foreground.

As shown, the method 500 beings at step 505 where an input layer of an ART network modeling the background state of a pixel in a scene receives appearance values for that pixel. In response, at step 510, the ART network compares the RGB input values to clusters in the ART network using the choice and vigilance tests.

At step 515, the ART network determines whether the input RGB values map to an existing cluster based on the choice and vigilance tests. If not, at step 520, the ART network generates a new cluster using the RGB input values as the prototype for the new cluster. And at step 525, the ART network may initialize a count for the new cluster. In one embodiment, the count is used to monitor the maturity of the new cluster. For example, a parameter may specify how many input RGB values should map to a cluster before the cluster is considered to model a background state for the scene. The actual value may be tailored to suit the needs of an individual case, e.g., based on the complexity of the scene being modeled as well as the frame rate at which input frames are supplied to the ART network. Note, such a frame rate may be different from the frame rate of a camera observing the scene. At step 530 the pixel is classified as depicting scene foreground.

Returning to step 515, if the input RGB values do map to an existing cluster (step 535), then that cluster is updated towards the input values. Additionally, the ART network may merge two clusters if the update results in two clusters that overlap by a specified amount (e.g., more than 50% of area is shared between two clusters). At step 540, the ART network updates the count of inputs mapped to the selected cluster. As noted above, the count may be used to monitor the maturity of a cluster in the ART network. Accordingly, at step 545, the ART network determines whether the cluster has (or is) mature (and therefore represents a background state for the pixel). If so, at step 550, the pixel is classified as depicting scene background, and the RGB values of the pixel in the input data may be used to update the corresponding RGB values in the background image. Otherwise, at step 555, the pixel is classified as depicting scene foreground. At step 560, clusters may be removed from the ART network. For example, in one embodiment, the BG/FG component may provide a tunable parameter specifying how frequently a cluster should be reinforced to avoid being removed from an ART network. The frequency may be specified relative to the frame rate at which frames are evaluated by the BG/FG component, the frame rate of the video, an elapsed time, or otherwise.

Figure 6:
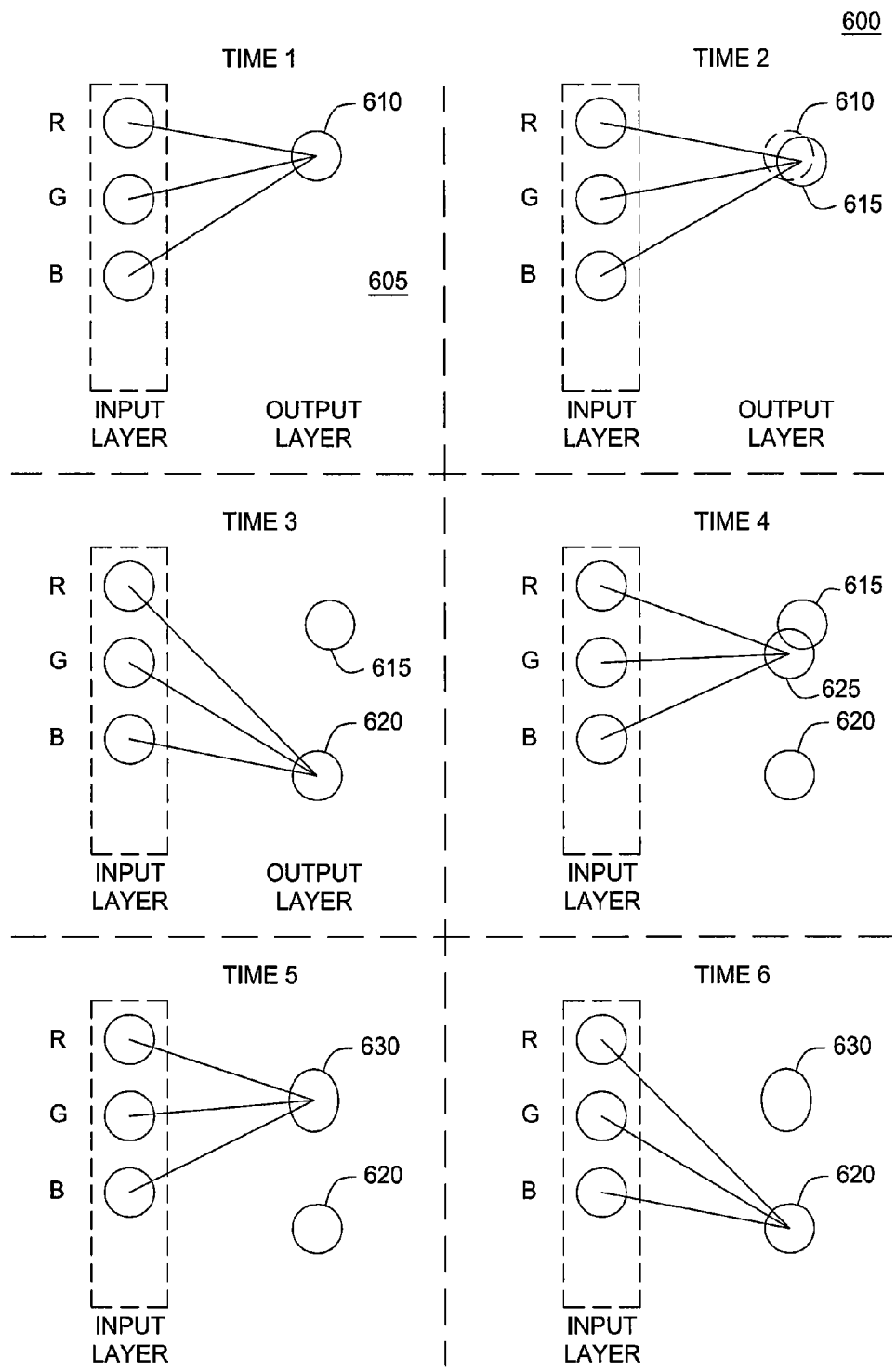
FIG. 6 illustrates a graphical representation of clusters in an ART network used to model complex and dynamic scene backgrounds, according to one embodiment of the invention.

FIG. 6 illustrates a graphical representation of clusters in an ART network 605 used to model complex and dynamic scene backgrounds, according to one embodiment of the invention. In this example, assume the inputs represent the RGB color values for a single pixel over multiple frames of video. As shown, at time 1, a set of inputs maps to an initial cluster 610 in ART network 605. Assume for this example that the pixel does, in fact, depict scene background and that after being reinforced over a number of frames, the cluster 610 matures and is considered to represent a background state for this pixel within the scene.

Assume at time 2, the RGB color values for the pixel in a subsequent frame is supplied to ART network 605. Illustratively, the inputs map to the cluster 610, within the limits defined by the variance and choice variable specified for this ART network. Accordingly, the pixel is classified as depicting background in the frame received at time 2 and the cluster 610 is updated using the set of inputs supplied at time 2. This results in a cluster 615 at a slightly different position. Assume at time 3, however, a frame is received with pixel color values that do not map to the cluster 610. And instead, the ART network 605 creates a new cluster 620. This could result from a foreground object occluding the background or a new background state being presented to the ART network 605. In either case, the pixel corresponding to the RGB values received at time 3 is classified as depicting scene foreground. In subsequent frames, if cluster 620 is reinforced with additional input values, then the BG/FG component may eventually recognize cluster 620 as a second background state for the pixel being modeled by ART network 605.

At time 4, assume that number of other frames has been received and that cluster 625 has emerged in the ART network. Further assume cluster 625 has matured as a background state for the pixel modeled by the ART network 605. As shown, however, cluster 625 substantially overlaps with cluster 615. In such a case, as additional pixel color values supplied to ART network 605, clusters 615 and 625 may drift closer together—to the point that they overlap by an amount greater than a specified percentage of their areas. When two clusters overlap by an amount that exceeds such a percentage, the ART network may merge the overlapping clusters. Doing so may help keep the number of distinct clusters managed by the ART network manageable. The results of the merger are shown at time 5, where cluster 630 has an elliptical shape derived form clusters 615 and 625. For example, as noted above, each cluster may have a mean and a variance in each of the X and Y directions (corresponding, e.g., to the R, G, and B pixel appearance values). In such a case the mean and variance from cluster 615 and cluster 625 (at time 4) may be used to create a merged cluster 630 shown at time 5.

At time 6, assume that a pixel with RGB values is received that maps to cluster 620 and that cluster 620 has matured. In response, therefore, the ART network classifies the pixel as depicting scene background. This may occur because the particular pixel depicts a portion of the scene that has multiple background states (e.g., an elevator door that can be open or closed (modeled by clusters 60 and 630). Alternatively, however, the background may have changed. For example, someone could have entered the scene and left a physical object behind. In such a case, cluster 620 could represent the current background state cluster 630 would eventually decay out of the ART network 605, as it is no longer being reinforced. Both scenarios are illustrated in FIGS. 7A-7B.

Figure 7A:
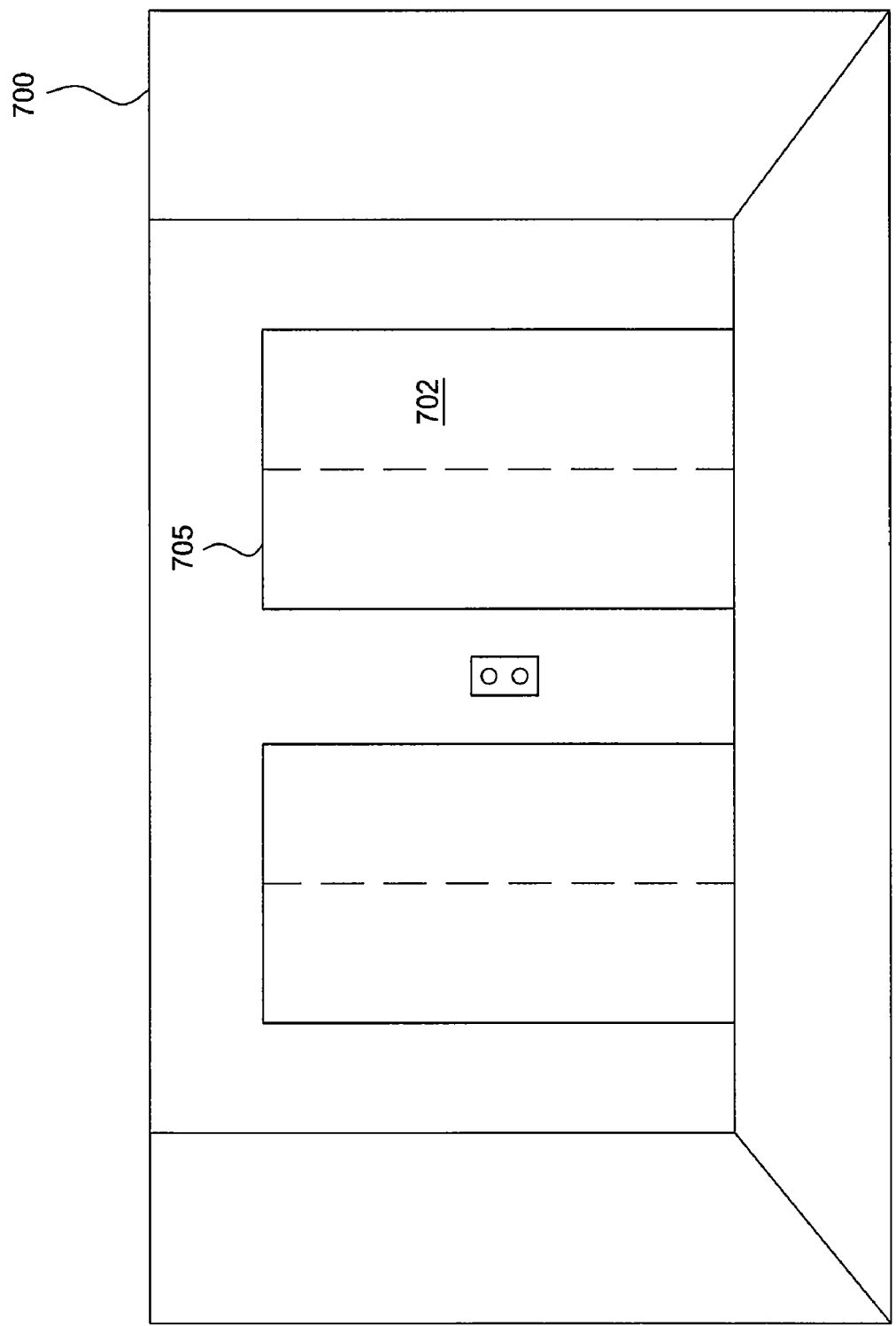
FIGS. 7A-7B illustrate an example of a scene with a dynamic background, according to one embodiment of the invention.
Figure 7B:
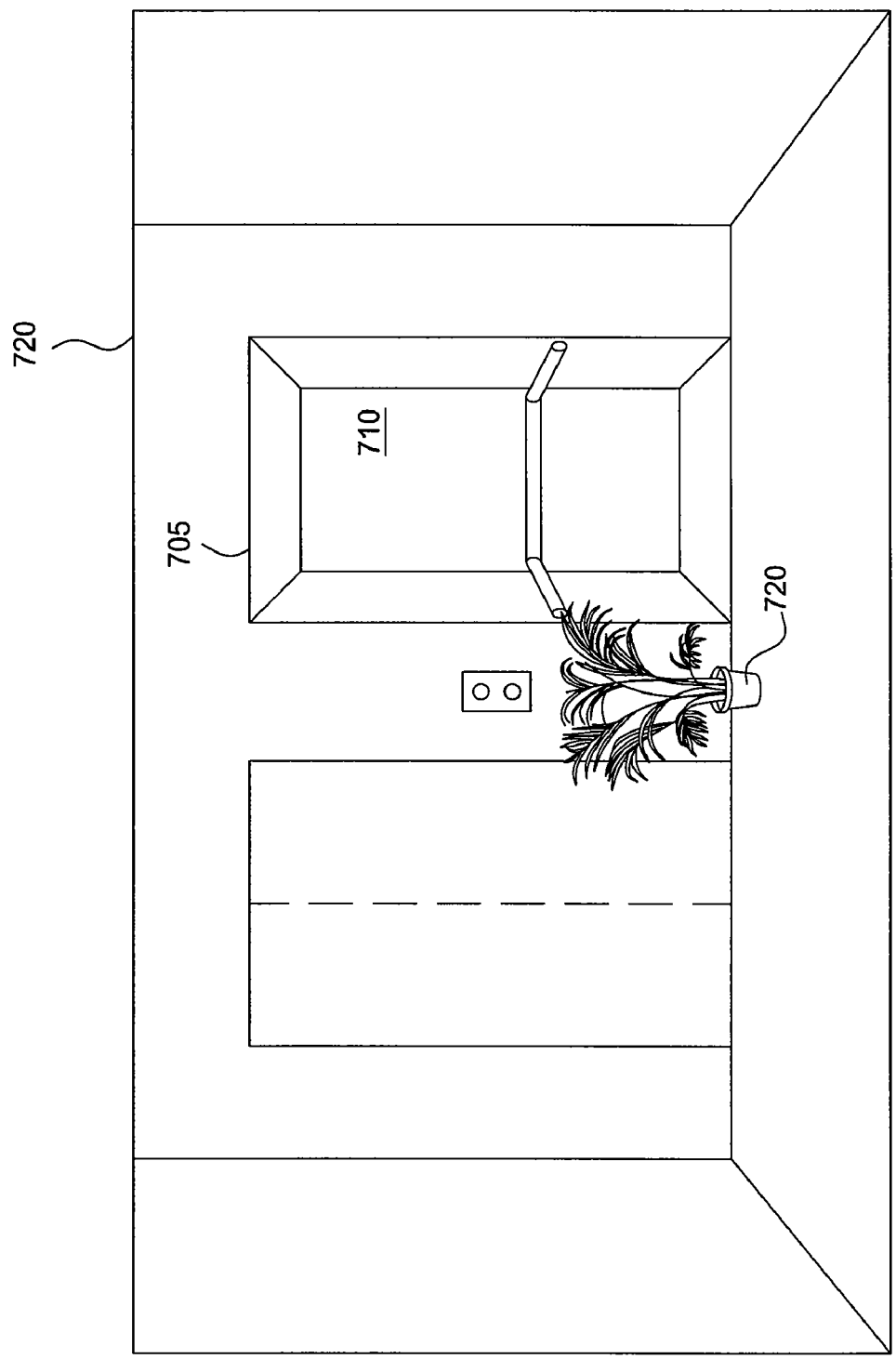

Specifically, FIGS. 7A-7B illustrate an example of a scene with a dynamic background, according to one embodiment of the invention. In this example, FIG. 7A shows a video frame 700 captured using a camera trained on a bank of two elevators, including elevator 705. Assume for this example that the camera observes the bank of elevators without any foreground elements occluding this scene for an extended period and that an ART network models the RGB pixel color for each pixel in this scene. Thus, a cluster emerges in each ART network representing the observed background state depicted in FIG. 7A. In this example, the doors 702 of elevator 705 are shown closed. Accordingly, the ART networks modeling the pixels depicting elevator doors 702 would have a cluster modeling the color of the elevator doors in this closed state. FIG. 7B illustrates a frame 720 of the same scene after elements of the background have changed. Specifically, elevator 705 is shown after the doors have opened, rendering an interior 701 of the elevator visible to the camera. However, the interior 710 of the elevator is not scene foreground. Accordingly, over time, the ART network modeling the pixels (which previously depicted the elevator doors) would have a cluster emerge that models the pixel colors of the interior 710 of the elevator. That is, the ART networks modeling these pixels would have a second cluster emerge modeling the distinct background state of the elevator doors being open.

Similarly, FIG. 7B shows a plant 715 having been placed between the elevators. Assume that a person (not shown) appeared in the scene and placed the plant at the final location shown in FIG. 7B. In such a case, when initially introduced into the scene, the plant 715 would be observed and tracked as a foreground object. However, once placed in the final location shown in FIG. 7B, the pixels color values depicting the plant 715 would become relatively fixed (depending on the noise in the camera). Further, the color values for each of these pixels would begin mapping to an immature cluster. However, such a cluster would be reinforced until the pixels depicting the plant mature to the point where the plant 715 becomes part of the background of the scene. That is, a new background state has been created which includes the plant 715. Further, whatever former clusters existing in the ART network for the pixels now depicting the plant 715 would now decay out of the background model as they are no longer reinforced. That is, the clusters modeling the color of the wall behind the plant are no longer reinforced and eventually decay out of the background model.

Advantageously, as described, embodiments of the invention provide techniques for modeling a background for a complex and/or dynamic scene over a period of observations without supervision. A background/foreground component of a computer vision engine may be configured to model a scene using an array of ART networks. The ART networks learn the regularity and periodicity of the scene by observing the scene over a period of time. The ART networks allow the computer vision engine to model complex and dynamic scene backgrounds in video.

While the foregoing is directed to embodiments of the present invention, other and further embodiments of the invention may be devised without departing from the basic scope thereof, and the scope thereof is determined by the claims that follow.

What is claimed is:

1. A computer-implemented method for generating a background model of a scene depicted in a sequence of video frames captured by a video camera, the method comprising:
  receiving a video frame, wherein the video frame includes one or more appearance values for each of a plurality of pixels;
  for one or more of the pixels:
    passing the appearance values for the pixel to an input layer of an adaptive resonance theory (ART) network corresponding to the pixel;
    mapping, by the ART network, the appearance values to one of one or more clusters of the ART network;
    classifying the pixel as depicting one of scene background and scene foreground, based on the mapping of the appearance values to the cluster of the ART network, wherein the pixel is classified as depicting scene background in response to determining that the cluster to which the appearance values are mapped to is a matured cluster in the ART network.

2. The method of claim 1, wherein the appearance values for the pixel comprise a set of RGB color values.

3. The method of claim 1, wherein mapping the appearance values to the cluster of the ART network comprises generating a new cluster in the ART network.

4. The method of claim 1, further comprising, decaying a first cluster out of the ART network in response to determining the first cluster has not been reinforced by the mapping of the appearance values to the first cluster.

5. The method of claim 1, further comprising merging two or more clusters in the ART network.

6. The method of claim 1, wherein mapping the appearance values to the cluster of the ART network comprises evaluating the appearance values according to a vigilance test and a choice test.

7. The method of claim 6, wherein the appearance values for the pixel comprise a set of RGB color values input to the ART network and the choice test comprises determining a Euclidean distance between the RGB color values input to the ART network and a prototype set of RGB values associated with the cluster.

8. The method of claim 6, wherein the appearance values for the pixel comprise a set of RGB color values input to the ART network and the vigilance test comprises determining a cosine angle and a prototype set of RGB values associated with the cluster, relative to an origin of the RGB space.

9. A computer-readable storage medium containing a program, which when executed on a processor, performs an operation for generating a background model of a scene depicted in a sequence of video frames captured by a video camera, the operation comprising:
receiving a video frame, wherein the video frame includes one or more appearance values for each of a plurality of pixels;
for one or more of the pixels:
passing the appearance values for the pixel to an input layer of an adaptive resonance theory (ART) network corresponding to the pixel;
mapping, by the ART network, the appearance values to one of one or more clusters of the ART network;
classifying the pixel as depicting one of scene background and scene foreground, based on the mapping of the appearance values to the cluster of the ART network, wherein the pixel is classified as depicting scene background in response to determining that the cluster to which the appearance values are mapped to is a matured cluster in the ART network.

10. The computer-readable storage medium of claim 9, wherein mapping the appearance values to the cluster of the ART network comprises generating a new cluster in the ART network.

11. The computer-readable storage medium of claim 9, wherein the operation further comprises, decaying a first cluster out of the ART network in response to determining the first cluster has not been reinforced by the mapping of the appearance values to the first cluster.

12. The computer-readable storage medium of claim 9, wherein the operation further comprises merging two or more clusters in the ART network.

13. The computer-readable storage medium of claim 9, wherein mapping the appearance values to the cluster of the ART network comprises evaluating the appearance values according to a vigilance test and a choice test.

14. The computer-readable storage medium of claim 13, wherein the appearance values for the pixel comprise a set of RGB color values input to the ART network and the choice test comprises determining a Euclidean distance between the RGB color values input to the ART network and a prototype set of RGB values associated with the cluster.

15. The computer-readable storage medium of claim 13, wherein the appearance values for the pixel comprise a set of RGB color values input to the ART network and the vigilance test comprises determining a cosine angle and a prototype set of RGB values associated with the cluster, relative to an origin of the RGB space.

16. A system, comprising:
a video input source configured to provide a sequence of video frames, each depicting a scene;
a processor; and
a memory containing a program, which, when executed on the processor is configured to perform an operation for generating a background model of a scene depicted in a sequence of video frames captured by a video camera, the operation comprising:
receiving a video frame, wherein the video frame includes one or more appearance values for each of a plurality of pixels;
for one or more of the pixels:
passing the appearance values for the pixel to an input layer of an adaptive resonance theory (ART) network corresponding to the pixel;
mapping, by the ART network, the appearance values to one of one or more clusters of the ART network;
classifying the pixel as depicting one of scene background and scene foreground, based on the mapping of the appearance values to the cluster of the ART network, wherein the pixel is classified as depicting scene background in response to determining that the cluster to which the appearance values are mapped to is a matured cluster in the ART network.

17. The system of claim 16, wherein mapping the appearance values to the cluster of the ART network comprises generating a new cluster in the ART network.

18. The system of claim 16, wherein the operation further comprises, decaying a first cluster out of the ART network in response to determining the first cluster has not been reinforced by the mapping of the appearance values to the first cluster.

19. The system of claim 16, wherein the operation further comprises merging two or more clusters in the ART network.

20. The system of claim 16, wherein mapping the appearance values to the cluster of the ART network comprises evaluating the appearance values according to a vigilance test and a choice test.

21. The system of claim 20, wherein the appearance values for the pixel comprise a set of RGB color values input to the ART network and the choice test comprises determining a Euclidean distance between the RGB color values input to the ART network and a prototype set of RGB values associated with the cluster.

22. The system of claim 20, wherein the appearance values for the pixel comprise a set of RGB color values input to the ART network and the vigilance test comprises determining a cosine angle and a prototype set of RGB values associated with the cluster, relative to an origin of the RGB space.

* * * * *

UNITED STATES PATENT AND TRADEMARK OFFICE
CERTIFICATE OF CORRECTION

PATENT NO. : 8,358,834 B2
APPLICATION NO. : 12/543336
DATED : January 22, 2013
INVENTOR(S) : Cobb et al.

Page 1 of 1

It is certified that error appears in the above-identified patent and that said Letters Patent is hereby corrected as shown below:

On the Title Page, Assignee Item (73):

Please delete "Behavioral Recognition Systems" and insert --Behavioral Recognition Systems, Inc.-- therefor;

In the Specifications

Column 8, Line 5, please delete "sifting" and insert --sitting-- therefor.

Signed and Sealed this
Twenty-eighth Day of May, 2013

Teresa Stanek Rea
*Acting Director of the United States Patent and Trademark Office*